(12) United States Patent
Audebert et al.

(10) Patent No.: US 7,363,486 B2
(45) Date of Patent: *Apr. 22, 2008

(54) METHOD AND SYSTEM FOR AUTHENTICATION THROUGH A COMMUNICATIONS PIPE

(75) Inventors: Yves Louis Gabriel Audebert, Los Gatos, CA (US); Olivier Clemot, Fremont, CA (US)

(73) Assignee: Activcard, Suresnes Cedex (FR)

( * ) Notice: Subject to any disclaimer, the term of this patent is extended or adjusted under 35 U.S.C. 154(b) by 972 days.

This patent is subject to a terminal disclaimer.

(21) Appl. No.: 09/844,439

(22) Filed: Apr. 30, 2001

(65) Prior Publication Data

US 2002/0162023 A1 Oct. 31, 2002

(51) Int. Cl.
*H04L 9/00* (2006.01)
*H04K 1/00* (2006.01)

(52) U.S. Cl. .................. 713/150; 713/168; 713/182; 713/183

(58) Field of Classification Search ............... 713/200, 713/201, 150, 182, 183, 168; 235/492; 726/26
See application file for complete search history.

(56) References Cited

U.S. PATENT DOCUMENTS

| | | | |
|---|---|---|---|
| 5,276,735 A | 1/1994 | Boebert et al. | |
| 5,455,863 A | 10/1995 | Brown et al. | |
| 5,499,297 A * | 3/1996 | Boebert | ............ 713/159 |
| 5,761,309 A | 6/1998 | Ohashi et al. | |
| 5,778,071 A | 7/1998 | Caputo et al. | |
| 5,917,168 A | 6/1999 | Nakamura et al. | |
| 5,944,821 A * | 8/1999 | Angelo | ............ 713/200 |
| 5,991,407 A | 11/1999 | Murto | |
| 6,005,942 A | 12/1999 | Chan et al. | |
| 6,018,779 A | 1/2000 | Blumenau | |
| 6,101,254 A | 8/2000 | Thiriet | |
| 6,101,255 A | 8/2000 | Harrison et al. | |
| 6,105,008 A | 8/2000 | Davis et al. | |
| 6,108,789 A | 8/2000 | Dancs et al. | |
| 6,128,338 A | 10/2000 | Behaghel et al. | |
| 6,131,811 A | 10/2000 | Gangi | |
| 6,144,671 A | 11/2000 | Perinpanathan et al. | |
| 6,181,735 B1 | 1/2001 | Sarat | |
| 6,192,473 B1 | 2/2001 | Ryan, Jr. et al. | |

(Continued)

FOREIGN PATENT DOCUMENTS

DE 19522527 1/1997

(Continued)

OTHER PUBLICATIONS

Global Platform, Open Platform, Terminal Specification, Version 1.5, Nov. 1999.

(Continued)

*Primary Examiner*—Kim Vu
*Assistant Examiner*—Linh L D Son
(74) *Attorney, Agent, or Firm*—Stevens, Davis, Miller & Mosher, LLP (57) ABSTRACT

A method and system for authenticating an end user to one or more remote computer systems using a communications pipe to send authentication codes from a personal security device to one or more remote computer systems and limiting authentication transactions to a secure hub.

17 Claims, 8 Drawing Sheets

U.S. PATENT DOCUMENTS

| | | | |
|---|---|---|---|
| 6,195,700 | B1 | 2/2001 | Bender |
| 6,233,683 | B1* | 5/2001 | Chan et al. ................. 713/172 |
| 6,279,047 | B1 | 8/2001 | Bublitz et al. |
| 6,385,729 | B1 | 5/2002 | DiGiorgio et al. |
| 6,434,238 | B1* | 8/2002 | Chaum et al. ................. 380/45 |
| 6,481,632 | B2 | 11/2002 | Wentker et al. |
| 6,575,360 | B1 | 6/2003 | Hagn |
| 6,602,469 | B1 | 8/2003 | Maus et al. |
| 6,694,436 | B1* | 2/2004 | Audebert .................... 713/200 |
| 6,718,314 | B2* | 4/2004 | Chaum et al. ................. 705/64 |
| 6,751,671 | B1 | 6/2004 | Urien |
| 6,807,561 | B2 | 10/2004 | Lagosanto et al. |
| 6,892,301 | B1* | 5/2005 | Hansmann et al. ......... 713/172 |
| 6,944,650 | B1 | 9/2005 | Urien |
| 6,993,131 | B1 | 1/2006 | Meyers |
| 7,028,187 | B1 | 4/2006 | Rosen |
| 7,046,810 | B2 | 5/2006 | Takada et al. |
| 2001/0039587 | A1* | 11/2001 | Uhler et al. ................. 709/229 |
| 2001/0045451 | A1 | 11/2001 | Tan et al. |
| 2002/0025046 | A1 | 2/2002 | Lin |
| 2002/0040936 | A1* | 4/2002 | Wentker et al. ............. 235/492 |

FOREIGN PATENT DOCUMENTS

| | | |
|---|---|---|
| DE | 197.24901 | 12/1998 |
| EP | 0911772 | 4/1999 |
| EP | 0923211 | 6/1999 |
| FR | 2779018 | 11/1999 |
| WO | 9852161 | 11/1998 |
| WO | 9962037 | 12/1999 |
| WO | 9962210 | 12/1999 |
| WO | 0116900 | 3/2001 |
| WO | 0122373 | 3/2001 |
| WO | 0159730 | 8/2001 |

OTHER PUBLICATIONS

Global Platform, Open Platform Terminal Framework, API Version 1.5.4, Jul. 20, 2000.

Global Platform, Multi Application- Smart Card Management Systems, Global Platform Functional Requirements, Version 3.3, Nov. 2000.

ISO/IEC 7816-4: 1995/Amd.1:1997(E) Information technology, Identification cards Integrated circuit(s) cards with contacts, Part 4: Interindustry commands for interchange, Amendment 1.

ISO/IEC 7816-4: 1995(E) Information technology, Identification cards, Integrated circuit(s) cards with contacts, Part 4: Interindustry commands for interchange.

ISO/IEC 7816-5: 1994/Amd. 1: 1996(E) Identification cards, Integrated circuit(s) cards with contacts, Part 5: Numbering system and registration procedure for application identifiers, Amendment 1.

ISO/IEC 7816-5: 1994(E) Identification cards, Integrated circuit(s) cards with contacts Part 5: Numbering system and registration procedure for application identifiers.

Java Card 2.1 Application Program Interface Sun Microsystems, Inc. Final Revision 1.1, Jun. 7, 1999.

Chen, Zhiqun, "How to write a Java Card applet: a Developer's Guide", Javaworld, Jul. 1999.

Chen, Zhiqun et al., "Understanding Java Card 2.0," Javaworld, Mar. 1998.

Posey, Brien, "Using Smart Cards with Windows 2000," TechCrawler.com, Sep. 28, 2000.

T. Ebringer, et al.; "Parasitic Authentication To Protect Your E-Wallet," Computer, IEEE Computer Society, Long Beach, CA, US, US, vol. 33, No. 10, Oct. 1, 2000, XP001001747, ISBN: 0018-9162, pp. 54-60.

Office Action dated Oct. 20, 2005 in U.S. Appl. No. 09/844,272.

Office Action dated Jan. 17, 2006 in U.S. Appl. No. 10/085,127.

Office Action dated Aug. 3, 2006 in U.S. Appl. No. 10/085,127.

International Search Report dated Mar. 9, 2002.

P. Trommler, et al.; "Smart cards and the OpenCard Framework," Java World, Jan. 1998, XP002173639, pp. 1-12.

Java Card 2.1 Application Programming Interface Sun Microsystems, Inc. Final Revision 1.1, Jun. 7, 1999.

N. Itoi, et al., Secure Internet Smartcards, CITI Technical Report 00-6, www.citi.umich.edu/projects/smartcard/, Center for Information Technology Integration, University of Michigan, pp. 1-12, Aug. 24, 2000.

International Search Report dated Aug. 23, 2002.

European Telecommunications Standards Institute: "Digital Cellular Telecommunications Systems (Phase 2+) (GSM): Universal Mobile telecommunications System (UMTS); Security Mechanisms for the (U) SIM application toolkit; Stage 2; (3GPP TS 23.048 version 4.1.0 Release 4)" ETSI TS 123 048 V4.1.0, Sep. 2001, pp. 1-35, XP002237189 ETSI Technical Specification.

"Digital Cellular Telecommunications System (Phase 2+) (GSMI); Specification of the SIM Application Toolkit for the Subscriber Identity Module—Mobile Equipment (SIM—ME) Interface (GSM 11.14 version 8.3.0 Release 1999)" ETSI TS 101 267 V8.3.0, XX, XX, Aug. 2000, pp. 1-69, 114, 115, XP002222021.

ISO/IEC 7816-4: 1995/Amd.1:1997(E) Information technology-Identification cards-Integrated circuit(s) cards with contacts, Part 4: interindustry commands for interchange, Amendment 1, pp. 1-5, Dec. 15, 1997.

ISO/IEC 7816-4: 1995(E) Information technology-Identification cards-Integrated circuit(s) cards with contacts, Part 4: Interindustry commands for interchange, pp. 1-46, Sep. 1, 1995.

U.S. Appl. No. 09/844,246 entitled "Method And System For Establishing A Remote Connection To A Personal Security Device", filed on Apr. 30, 2001 by Y. Audebert, et al.

U.S. Appl. No. 09/844,439 entitled "Method And System For Authentication Through A Communication Pipe", filed on Apr. 30, 2001 by Y. Audebert, et al.

International Search Report dated May 28, 2003.

T. Ebringer, et al.; "Parasitic Authentication To Protect Your E-Wallet," Computer, IEEE Computer Society, Long Beach, CA, US, US, vol. 33, No. 10, Oct. 1, 2000, XP001001747, ISBN: 0018-9162, pp. 54-60.

International Search Report dated Aug. 27, 2002.

International Search Report dated Sep. 3, 2002.

P. Trommler, et al.; "Smart Cards and the OpenCard Framework," Java World, Jan. 1998, XP002173639, pp. 1-12.

* cited by examiner

METHOD AND SYSTEM FOR AUTHENTICATION THROUGH A COMMUNICATIONS PIPE

CROSS-REFERENCE TO RELATED APPLICATIONS

The present application is related to pending U.S. patent applications Ser. Nos. 09/844,246, 09/844,272 entitled, "METHOD AND SYSTEM FOR ESTABLISHING A REMOTE CONNECTION TO A PERSONAL SECURITY DEVICE," and "METHOD AND SYSTEM FOR REMOTE MANAGEMENT OF PERSONAL SECURITY DEVICES" both filed on Apr. 30, 2001, having the same inventors as those of the present application and assigned to the assignee of the present invention. Applicant hereby incorporates by reference the above-mentioned Co.-pending applications.

FIELD OF INVENTION

The present invention relates to a data processing method for end user authentication over a network for purposes of obtaining secure functions or data from one or more remote computer systems. More particularly, the invention relates to a method of authenticating an end user to multiple remote computer systems using a communications pipe and a personal security device.

BACKGROUND OF INVENTION

One of the simplest and most commonly used authentication methods employed is the static password, whereby a client computer challenges an end user for a pre-determined password. Once the end user provides the correct password, access is permitted to secure functions or data available on one or more remote computer systems. A significant limitation of the current art is that localized authentication transactions are potentially vulnerable to compromise by unauthorized programs running on the local client or by other illicit means intending to monitor the password authentication process. In a single point authentication process, once a point of entry to a network is compromised, all locations using the same security codes are generally compromised as well.

One security method commonly used to overcome single point authentication failures employs the use of separate static passwords for each pre-determined secure resource, While this method is an improvement over a single multi-use password, this method is still vulnerable to illicit password monitoring, requires an end user to remember multiple passwords, and inefficiently ties up network resources by repeating the entire authentication process each time access to a different secure resource is requested.

Also, as a practical consideration. requiring an end user to remember several different passwords typically results in the same password being used for all secure resources, hence defeating the entire purpose of performing multiple authentications using static passwords.

A more sophisticated approach than the previously described methods, involves the use of personal security devices (PSD) such as smart cards, which allows storage of multiple credentials, passwords, certificates, private keys, etc. By implementing the use of smart cards, the ability to compromise passwords is significantly reduced. However, PSDs are still somewhat vulnerable to illicit monitoring during local client cryptographic key generation as described in the background of the invention section of cross-referenced patent application,09/844,246 OCL1, "Method and System for Establishing a Remote Connection To a Personal Security Device." An additional limitation of this method becomes apparent when attempting to perform multiple authenticating transactions using a single PSD over a network connection. The PSD, beings a slow serial device, only allows one transaction to occur at a time. In addition, network contention and processor execution speed issues become particularly problematic when low bandwidth connections (e.g. dialup connections) are made between a client and a remote computer system during authentication with the PSD.

SUMMARY OF INVENTION

This invention resides in a method of authenticating an end user to one or more remote computer systems using a communications pipe to send authentication codes from a PSD to one or more secure remote computer systems. The remote computer system establishing and maintaining the communications pipe with the PSD performs an initial authentication, then acts as a secure hub and client authentication proxy for other remote computer systems requesting client authentication. In a multi-tasking operating environment, multiple authentications occur as background transactions, which are transparent to the end user, The remote computer system acting as a secure hub may form multiple communications pipes with other clients connected to a network.

In order to perform authentications, a communications pipe is established between a remote computer system and a PSD as previously described in cross-referenced patent application, 09/844,246 OCL-1, "Method and System for Establishing a Remote Connection To a Personal Security Device." A remote computer system requiring client authentication sends an authentication challenge to either the client and is redirected to the remote computer system acting as a secure hub or using a pre-established address, sends an authentication challenge directly to the remote computer system maintaining the communications pipe.

In a one embodiment of this invention, the remote computer system assigned as a secure hub performs the initial client authentication then routes subsequent authentication challenges through the communications pipe to the PSD for, processing within the secure domain of the PSD, then returns the PSD generated authentication code back through the communications pipe over a network and to the challenging remote computer system.

In a second embodiment of this invention, the remote computer system established as a secure hub performs the initial client authentication then copies, if not already present, the PSD's authentication credentials through the communications pipe to a secure storage location within the secure hub. The secure hub using the transferred PSD credentials and equivalent algorithms authenticates the client to subsequent remote computer systems by emulating the PSD.

In both embodiments of this invention, communications between local clients and remote computers systems over one or more networks should employ secure communications protocols as is described in the cross-referenced patent application, 09/844,246 OCL-1, which further reduces the likelihood of unauthorized access or interception, For non-proprietary transactions with the PSD , secure communications are optional.

There are several advantages to this invention when used in conjunction with the communications pipe. First and most importantly, authentication transactions are only performed in highly secure and protected domains, which greatly reduces the chances of unauthorized access or interception. Secondly, authentication transactions will occur more rapidly and seamlessly, since remote computer systems are generally provided with greater network bandwidth and processing power than local clients.

Lastly, by relocating the authentication process to a remote computer system, a more simplified means to perform end-to-end authentication and maintain an audit trail of transactions by authenticated end users and transactions with other remote computer systems is readily accomplished since all authentication transactions are routed through a remote computer system designated as a secure hub.

Additional security improvements may be facilitated by incorporating the use of hardware security modules (HSM) at designated remote computer systems implementing the secure hub portion of the invention. End-to-end security is enhanced since authentications and related transactions occur within the highly secure domains of a PSD and HSM.

DETAILED DESCRIPTION OF PREFERRED EMBODIMENT

Figure 1:
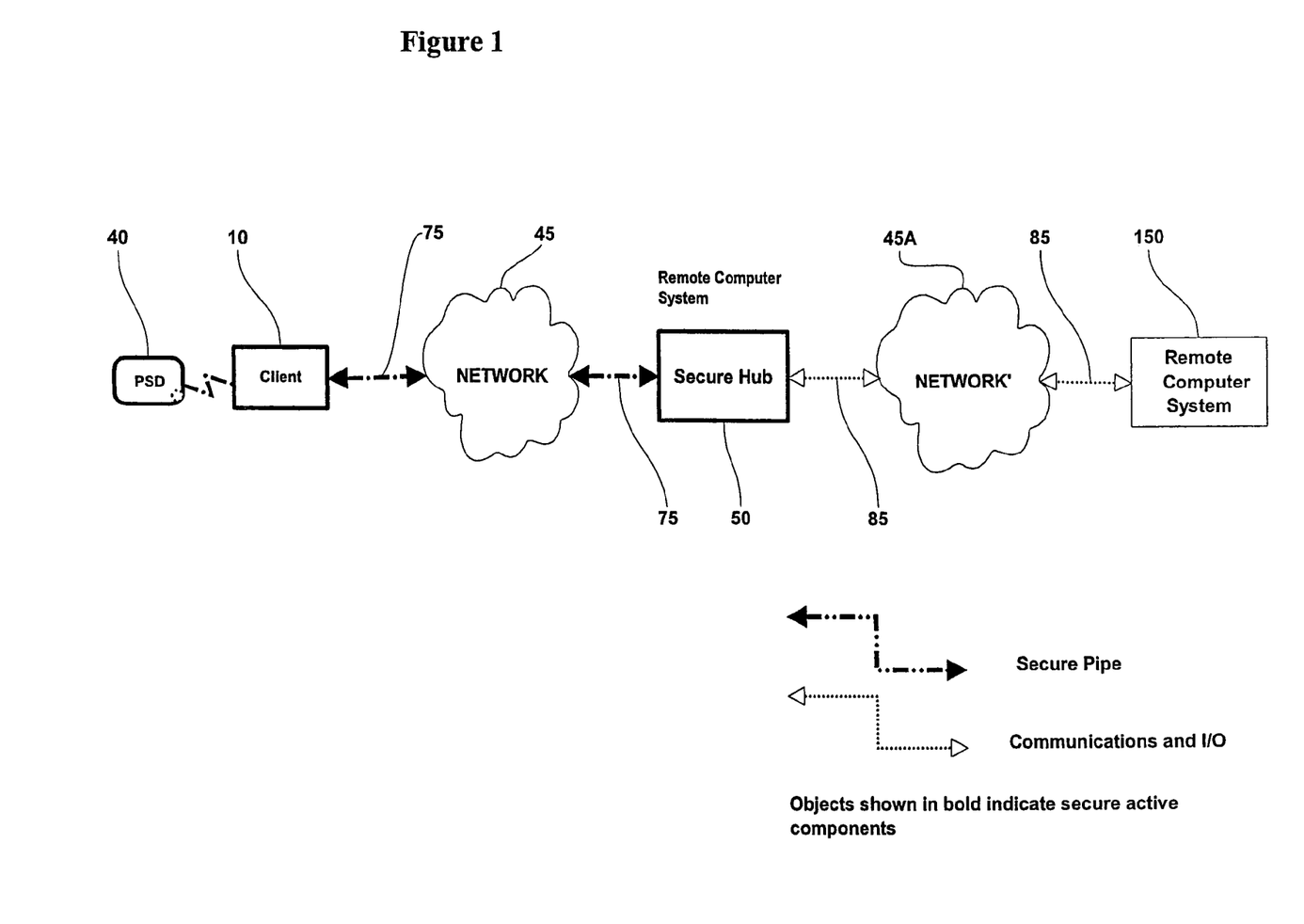
FIG. 1—is a general system block diagram for implementing present invention.
Figure 4:
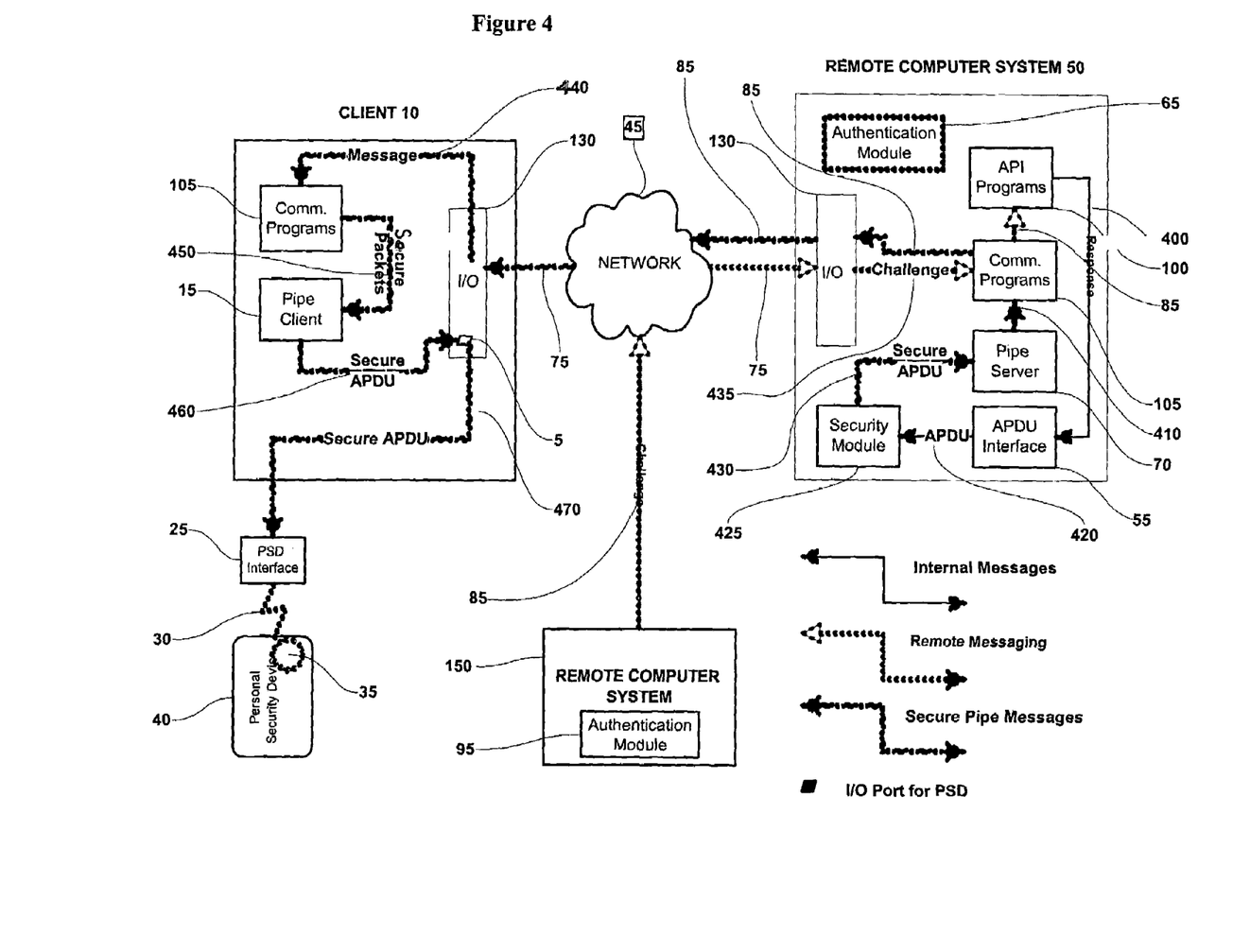
FIG. 4—is a detailed block diagram illustrating remote authentication challenge.
Figure 5:
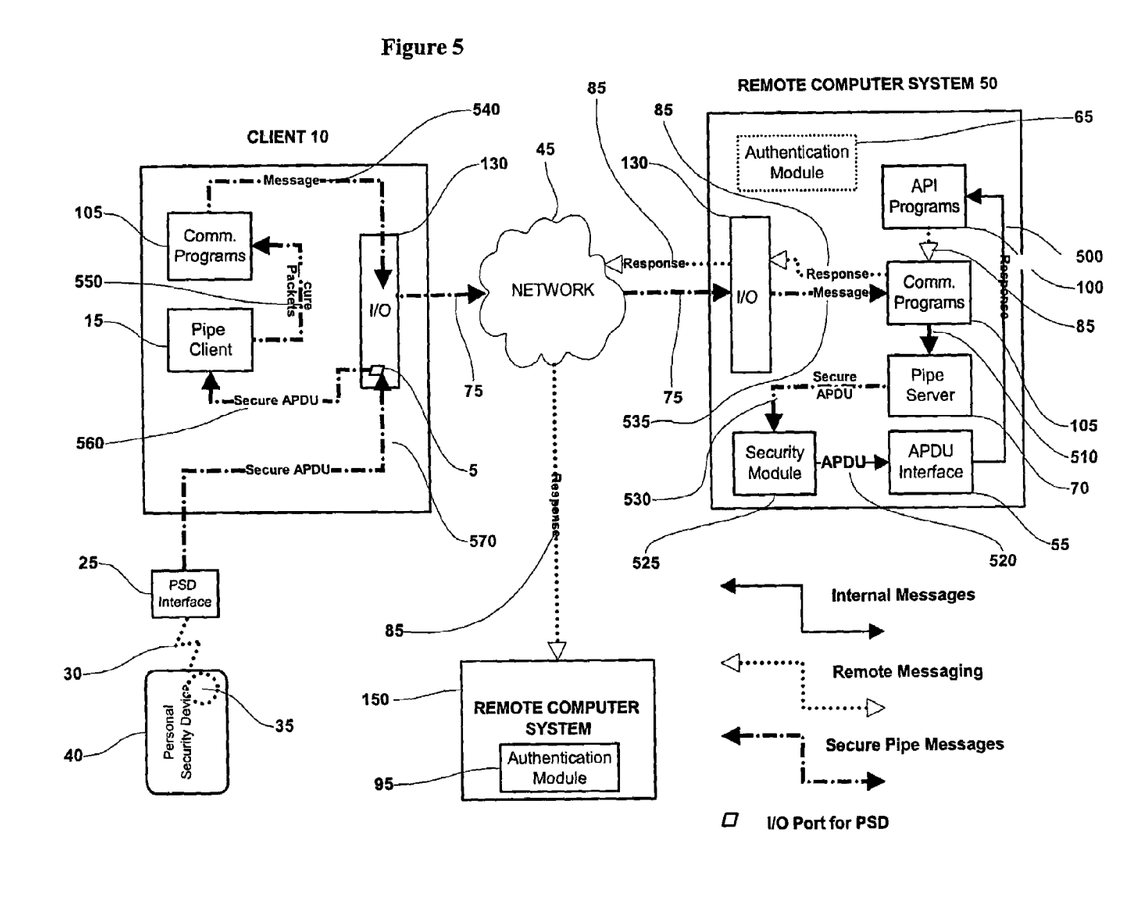
FIG. 5—is a detailed block diagram illustrating remote authentication.
Figure 6:
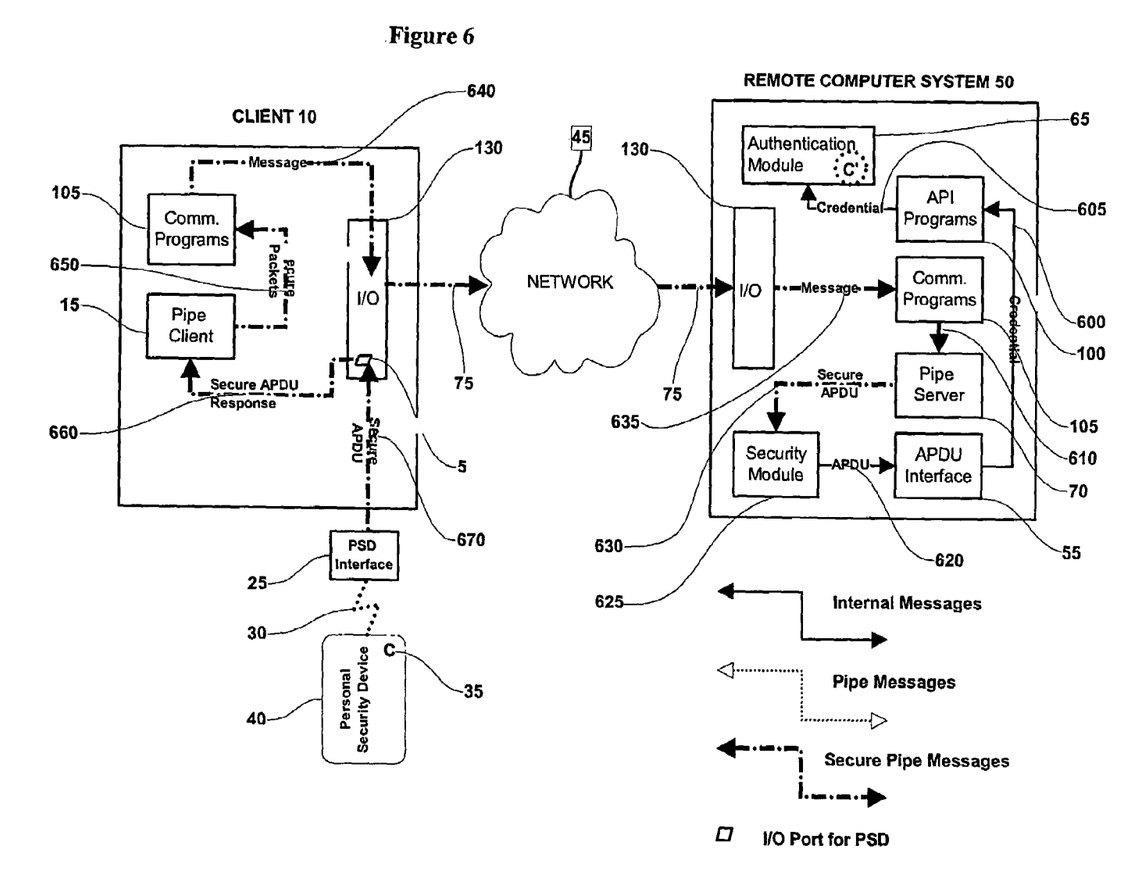
FIG. 6—is a detailed block diagram illustrating authentication credential transfer.
Figure 7:
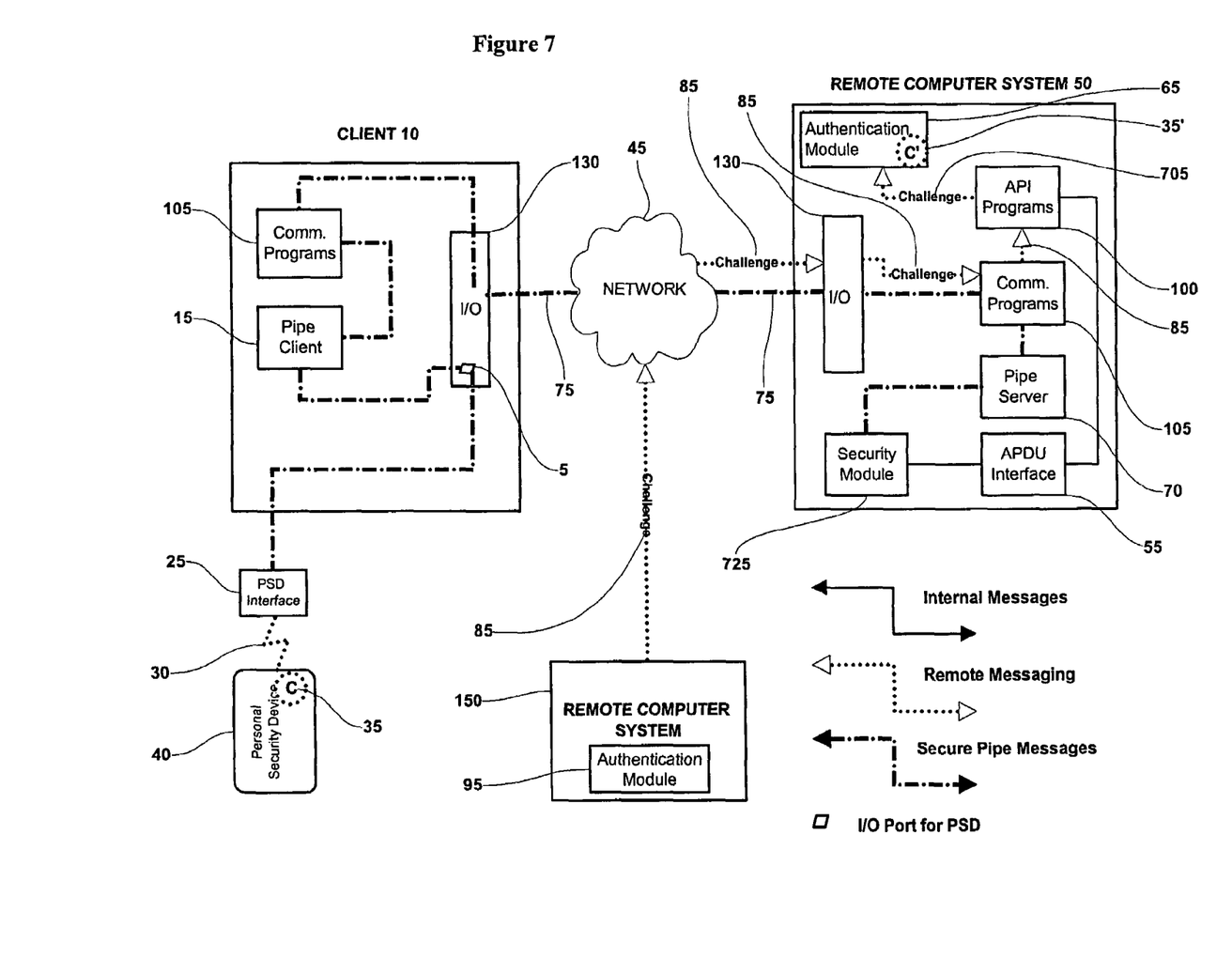
FIG. 7—is a detailed block diagram illustrating remote authentication challenge (Alternate inventive embodiment.)
Figure 8:
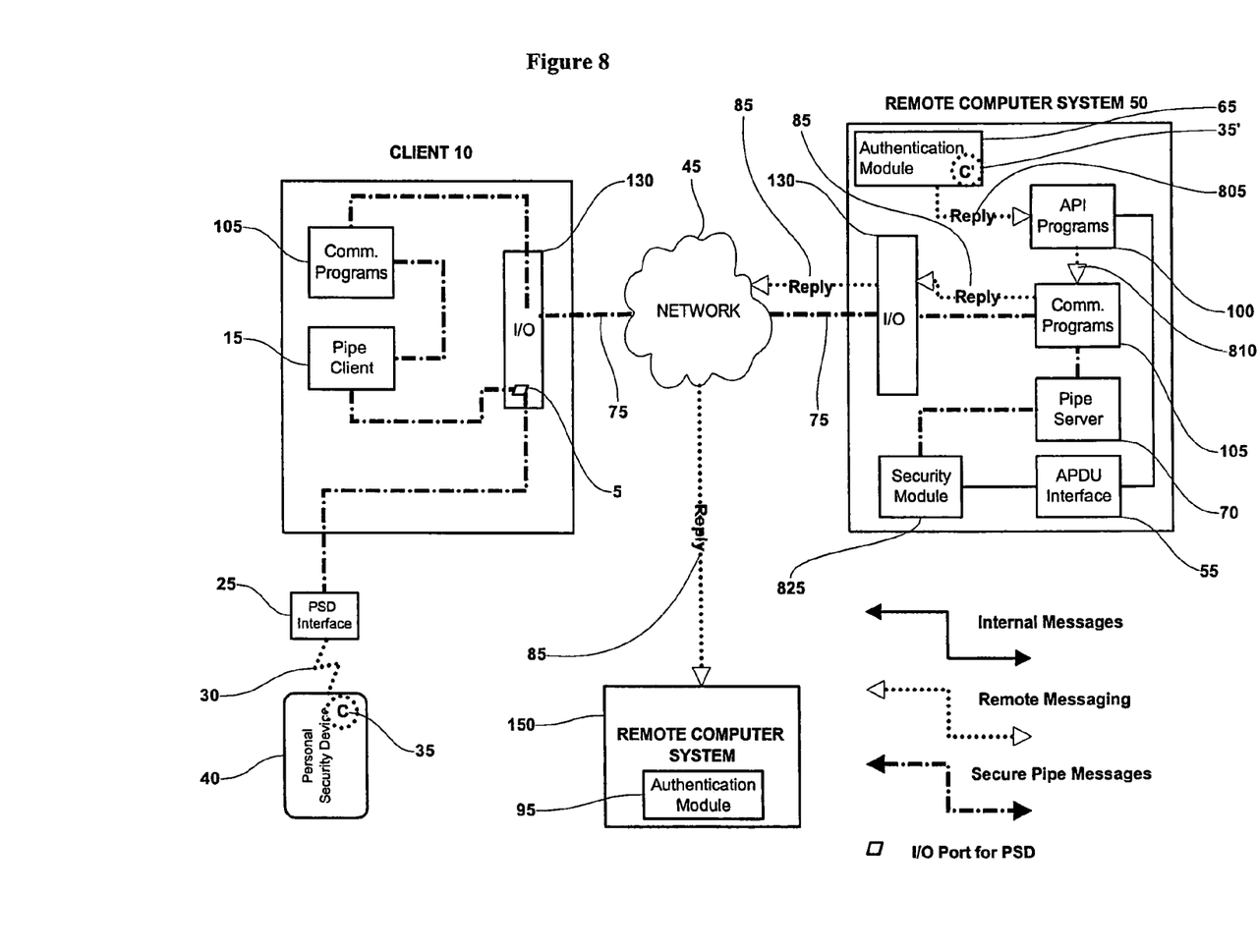
FIG. 8—is a detailed block diagram illustrating remote authentication (Alternate inventive embodiment.)

The steps involved in performing authentication through a communications pipe are shown in FIGS. 1 through 8. FIG. 1 is a generalized system block diagram. FIGS. 2 through 5 illustrate one embodiment of the invention where responses to authentication challenges are generated within the secure domain of a Personal Security Device. FIGS. 6 through 8 illustrate a second embodiment of the invention where a remote computer system established as a secure hub provides the proper response to authentication challenges, rather than directing challenges through the communications pipe into the PSD for processing. Characters shown with a prime sign (e.g. C') indicate a duplicate of an original authentication credential Other drawing details shown but not described in this application refer to information described in cross-referenced patent application, 09/844,246 OCL-1, "Method and System for Establishing a Remote Connection to a Personal Security Device".

Referring now to FIG. 1, a generalized system block diagram of the invention where Client 10 and a connected Personal Security Device 40 is connected over a network 45 with a remote computer system 50 using a communications pipe 75 as described in Co.-pending patent application 09/844,246 OCL-1. A remote computer system 50, is operating as a secure hub following initial authentication as described below, to service authentication requests made by other remote computer systems sent over a network 45 or 45A.

The remote computer system 150 is an example of a system requiring authentication when a request for secure functions or data is sent from client computer 10 over the networks 45 and 45A. The communications pipe 75 applies to authentication transactions but does not restrict nor control non-secure transactions occurring over either network 45 or 45A.

Networks 45 and 45A may be a common network as in a virtual private networking arrangement or separate networks such as private intranet and public internet arrangements. The networks 45 and 45A are depicted separately for illustrative purposes only. No limitation is intended in the number of PSDs and clients forming communications pipes 75 with one or more secure hubs 50; nor should any limitation on the number of remote computer systems 70 available for authentication be construed from the drawing. Transactions not involving authentications are not restricted to the secure hub.

The basic operation of the secure hub may be initiated when an end user at a client requests access to secure functions or data contained on one or more remote computer systems connected by a network. An available remote computer system, in which a communications pipe has been established as described in Co.-pending application OCL-1, authenticates the end user and client using the security mechanisms contained within the secure domain of the PSD. Alternatively, an external event such as a need to update information within a PSD may trigger a remote computer system other than the secure hub to initiate the authentication process.

Once an initial client authentication has been accomplished by the remote computer system, subsequent authentication challenges transmitted over a network 45 or 45A made by other remote computer systems are directed to the remote computer system 50 acting as a secure hub and depending on which embodiment of the invention employed, are either routed through the appropriate communications pipe 75 to PSD 40 or are directly authenticated by the remote computer system 50.

Figure 2:
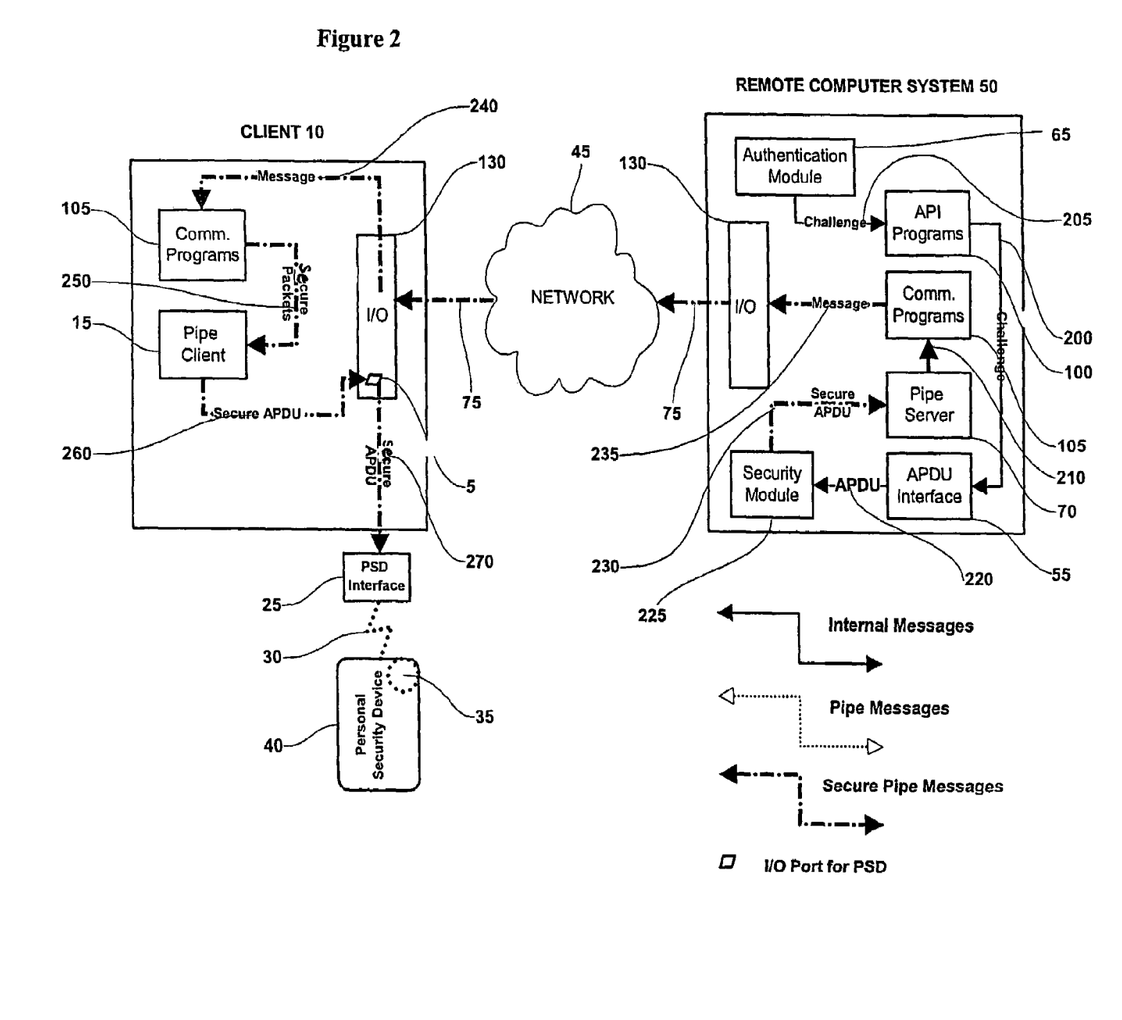
FIG. 2—is a detailed block diagram illustrating initial authentication challenge.

Referring to FIG. 2, to establish a secure hub, a Client 10 causes an authentication challenge to be generated on a remote computer system 50, by requesting access to secure functions or data over a network 45 or 45'. Upon receiving the request from client 10, remote computer system 50 generates an authentication challenge 205 within a secure domain designated as authentication routine 65. The authentication challenge is processed by an API level program 100 and routed 200 to an APDU interface 55 for translation into an APDU format. The APDUs are then sent 220 to a Security Module 225 for encryption. The encrypted APDUs are then routed 230 to a Pipe Server 70 for encapsulation into outgoing messaging and sent 210 to the communications programs 105 for transmission over the communications pipe 75, through the network 45 into the network interface 130 of the client 10. The incoming messages are then routed 240 to communications programs 105 for processing.

Following processing. the messages are sent 250 to a pipe client 15 for separation of the encapsulated APDUs. The APDUs are then sent 260 through a hardware device port 5 assigned to a PSD Interface 25. PSD Interface 25 routes the incoming APDUs into the PSD 40 via connection 30, where it is subsequently decrypted and processed within its secure domain 35.

Figure 3:
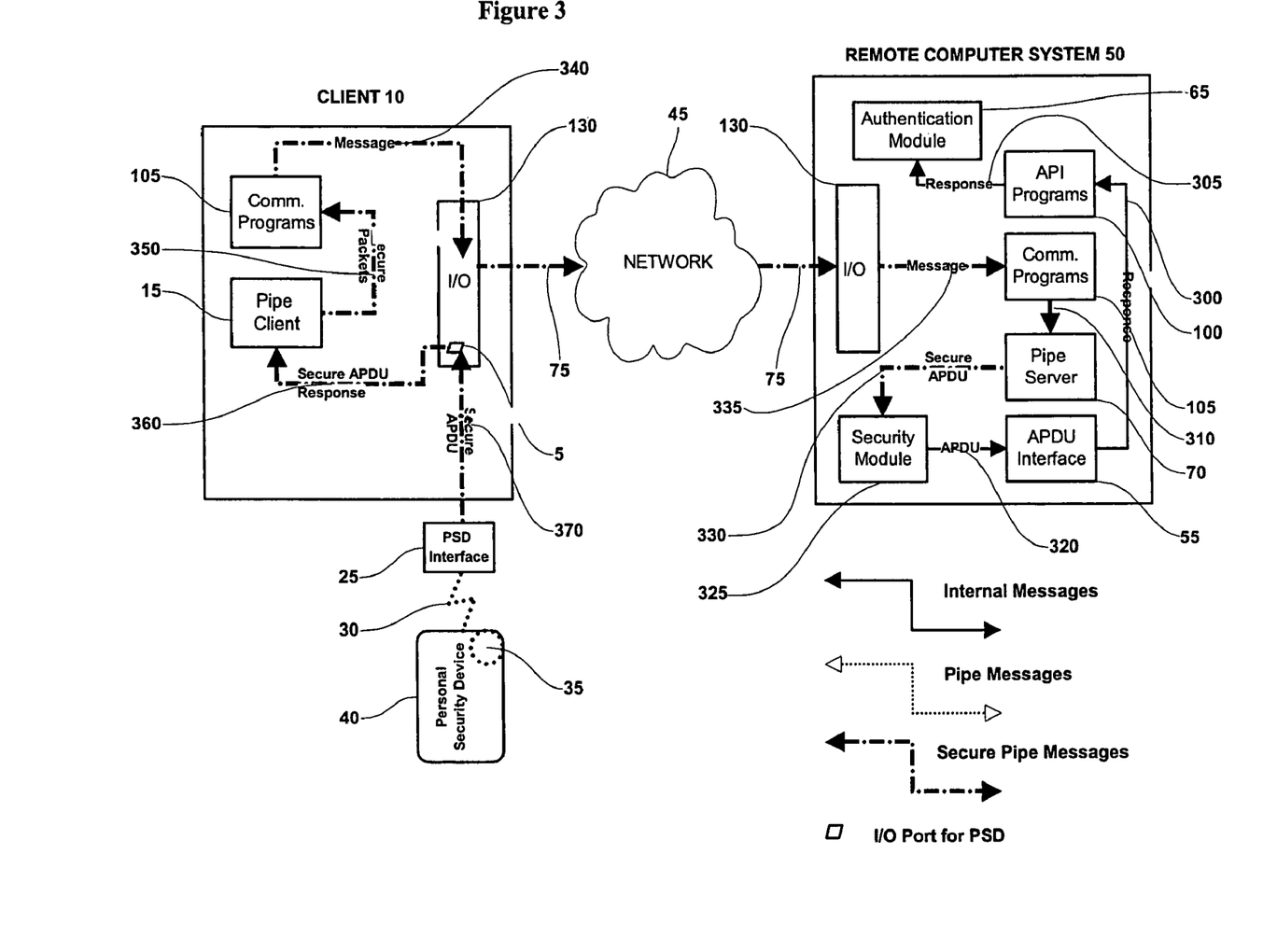
FIG. 3—is a detailed block diagram illustrating initial authentication.

Referring to FIG. 3, once PSD 40 has processed the authentication challenge within the secure domain of the PSD 35, an authentication response message is generated using a pre-established cryptography method.

The authentication response is sent in APDU format from PSD 40 through connection 30 and into PSD interface 25. The PSD secure response is then routed 370 through hardware device port 5 and sent 360 to the Pipe Client 15 for processing and encapsulation. The resulting message packets are then sent 350 to the Client-side Communications Programs 105 for processing, encryption using a pre-established secure communications protocol and incorporation into outgoing message packets 340. The message packets 340 containing the encapsulated APDUs are transmitted 75 over the network 45 via a network interface card (I/O) 130.

The Remote Computer System 50, receives the message packets 335 containing the encapsulated APDUs from the network 45 via a network interface card (I/O) 130 installed on the Remote Computer System. The incoming messages are processed and decrypted using the pre-established cryptography method employed in the secure communications protocol by the server-side Communications Programs 105 and routed 310 into the Pipe Server 70 for secure APDU extraction. The extracted secure APDUs are sent 330 to the Security Module 325 for decryption of the secure APDUs using the pre-established cryptography method. The decrypted APDUs are then routed to the APDU Interface 55 for processing and translation into a higher-level format and sent 300 to API Level programs 100 for processing. If authentication is successful, the remote computer system 50 allows access to secure functions or data and establishes itself as a secure hub. If authentication fails, the end user will be unable to access secure functions or data.

Referring to FIG. 4, once the secure hub has been established as previously described, remote authentication of additional remote computer systems may be accomplished. Remote authentication may be initiated either by a client's request for access to secure functions or data or by other remote computer systems to perform transactions within the secure domain of a PSD.

To perform a remote authentication, a challenge 85 is issued by a second remote computer system 150. The challenge is routed over a network 45, into the secure hub 50. The incoming challenge is processed and decrypted in the secure hub 50 using the pre-established cryptography method employed in the secure communications protocol by the server-side Communications Programs 105 and routed 85 to an API level program 100 where it is processed and routed 400 to an APDU interface 55 for translation into an APDU format. The APDUs are then sent 420 to a Security Module 425 for encryption. The encrypted APDUs are then routed 430 to a Pipe Server 70 for encapsulation into outgoing messaging and sent 410 to the communications programs 105 for transmission over the communications pipe 75, through the network 45 into the network interface 130 of the client 10.

The incoming messages are then routed 440 to a communications programs 105 for processing. Following processing, the messages are sent 450 to a pipe client 15 for separation of the encapsulated APDUs. The APSUs are then sent 460 through a hardware device port 5 assigned to a PSD Interface 25. PSD Interface 25 routes the incoming APDUs into the PSD 40 via connection 30, where it is subsequently decrypted and processed within its secure domain 35.

Referring to FIG. 5, once PSD 40 has processed the authentication challenge within the secure domain of the PSD 35, an authentication response message is generated using a pre-established cryptography method. The authentication response is sent in APDU format from PSD 40 through connection 30 and into PSD interface 25. The PSD secure response is then routed 570 through hardware device port 5 and sent 560 to the Pipe Client 15 for processing and encapsulation. The resulting message packets are then sent 550 to the Client-side Communications Programs 105 for processing, encryption using a pre-established secure communications protocol and incorporation into outgoing message packets 540. The message packets 540 containing the encapsulated APDUs are transmitted 75 over the network 45 via network interface card (I/O) 130.

The Remote Computer System 50, receives the message packets 535 containing the encapsulated APDUs from the network 45 via network interface card (I/O) 130 installed on the Remote Computer System. The incoming messages are processed and decrypted using the pre-established cryptography method employed in the secure communications protocol by the server-side Communications Programs 105 and routed 510 into the Pipe Server 70 for secure APDU extraction. The extracted secure APDUs are sent 530 to the Security Module 525 for decryption of the secure APDUs using the pre-established cryptography method. The decrypted APDUs are then routed 520 to the APDU Interface 55 for processing and translation into a higher-level format and sent 500 to API Level programs 100 for processing. Authentication Module 65 within the secure hub remains inactive during the transfer of authentication information. The authentication response message is then routed 85 into the Communications Programs 105 where the response is sent over the network 45 in a pre-established secure communications protocol to the challenging remote computer system 150.

The incoming response message is decrypted and sent to an Authentication Module 95. If authentication is successful, the remote computer system 150 allows access to secure functions or data. If authentication fails, the end user will be unable to access secure functions or data.

Referring to FIG. 6 depicts an alternate embodiment of the current invention where the remote computer system 50 established as a secure hub transfers copies of the PSD 40 credentials C 35, if not pre-existing on the secure hub. To perform credential transfer, an initial authentication transaction is performed by a remote computer system 50 as previously described. Following authentication, additional commands are sent by the remote computer system 50 to transfer the specified credentials.

The credentials are generated using a pre-established cryptography method and sent in APDU format from PSD 40 through connection 30 and into PSD interface 25. The PSD secure response is then routed 670 through hardware device port 5 and sent 660 to the Pipe Client 15 for processing and encapsulation. The resulting message packets are then sent 650 to the Client-side Communications Programs 105 for processing, encryption using a pre-established secure communications protocol and incorporation into outgoing message packets 640. The message packets 640 containing the encapsulated APDUs are transmitted 75 over the network 45 via a network interface card (I/O) 130.

The Remote Computer System 50, receives the message packets 635 containing the encapsulated APDUs from the network 45 via network interface card (I/O) 130 installed on the Remote Computer System.

The incoming messages are processed and decrypted using the pre-established cryptography method employed in the secure communications protocol by the server-side Communications Programs 105 and routed 610 into the Pipe Server 70 for secure APDU extraction. The extracted secure APDUs are sent 630 to the Security Module 625 for decryption of the secure APDUs using the pre-established cryptography method. The decrypted APDUs are then routed 620 to the APDU Interface 55 for processing and translation into a higher-level format and sent 600 to API Level programs 100 for processing and subsequently sent 605 to the Authentication Module 65 for secure storage and future use. The transferred authentication information is shown in FIG. 6 as C'.

In FIG. 7, an authentication challenge 85 is sent by a remote computer system 150 over a network 45. Remote Computer System 50 receives the incoming challenge 85 from the network 45 via network interface card 130 installed on the Remote Computer System. The incoming challenges 85 are processed and decrypted using the pre-established cryptography method employed in the secure communications protocol by the server-side Communications Programs 105 and routed to API Level programs 100 for processing. The processed challenge is then sent 705 to the Authentication Module 65 for authentication using the PSD's 10 transferred credentials C' 35'. The communications pipe 75 may remain intact during this process to allow for other transactions to occur.

Referring to FIG. 8, the secure hub 50 generates an authentication reply within the Authentication Module 65 which is sent 805 to the API Level Programs 100 for processing, and subsequently routed 810 to the Server-side Communications Programs 105 for processing, encryption using a pre-established secure communications protocol and incorporation into outgoing message packets. The message packets are routed over the network 45 to the challenging remote computer system 150. The incoming messages are then decrypted and the authentication reply processed by an internal authentication module 95. If authentication is successful, the remote computer system 150 allows access to secure functions or data. If authentication fails the end user will be unable to access secure functions or data.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. Other variations and embodiments are possible in light of above teachings, and it is not intended that this Detailed Description limit the scope of invention, but rather by the Claims following herein.

What is claimed:

1. A system for providing authentication over a network using a pre-established communications pipe, comprising at least one client, at least one PSD, at least one first remote computer system, at least one subsequent remote computer system, and at least one network wherein said network includes means for functionally connecting and communicating with at least one client and one or more remote computer systems, said at least one client, further comprising:

means for functionally connecting to a PSD Interface and said network, means for functionally communicating over said network with said first remote computer system and means for establishing a communications pipe; said means for establishing a communications pipe comprising:

client communications means for transmitting and receiving message packets over said network using a packet based communications protocol, and for transmitting and receiving APDUs through said PSD Interface, first client data processing means for receiving incoming message packets from said first remote computer system using said client communications means, separating encapsulated APDUs from said incoming message packets thus generating decapsulated APDUs and routing said decapsulated APDUs to said PSD through said PSD Interface independently of the origin and integrity of said incoming message packets, and second client data processing means for receiving incoming APDUs from said PSD interface, encapsulating said incoming APDUs into outgoing message packets and routing said outgoing message packets to said first remote computer system through said client communications means;

means for transferring incoming commands sent from said first remote computer system through said established communications pipe to said PSD; and means for transferring outgoing responses generated by said PSD to said first remote computer through said established communications pipe;

said at least one PSD further comprising;

at least one embedded PSD authenticating means, means to respond to at least one incoming command, means to generate an outgoing authentication response, and cryptography means for decrypting said incoming commands and encrypting said outgoing responses, wherein said PSD is functionally connected and is functionally communicating with said client and said first remote computer system;

said at least one first remote computer system further comprising;

means for generating outgoing commands in a proper protocol for communicating with said PSD through said established communications pipe, a first authenticating means for authenticating said PSD responses, cryptography means for decrypting said incoming responses and encrypting said outgoing commands, processing and routing means for transferring authentication challenges received over said network from said subsequent remote computer system to said PSD for authentication through said established communications pipe, and processing and routing means for transferring authentication responses received through said established communications pipe from said PSD to said subsequent remote computer system over said network, wherein said first remote computer system is functionally connected to said network and is functionally communicating with said client and said PSD using said established communications pipe; and said at least one subsequent remote computer system further comprising:

means to generate authentication challenges, and a second authenticating means for authenticating responses received over said network from said PSD through said first remote computer system, wherein said subsequent remote computer system is functionally connected to said network and is functionally communicating with said first remote computer system.

2. A system for providing authentication over a network using a pre-established communications pipe, comprising at least one client, at least one PSD, at least one first remote computer system, at least one subsequent remote computer system, and at least one network wherein said network includes means for functionally connecting and communicating with at least one client and one or more remote computer systems, said at least one client, further comprising;

means for functionally connecting to a PSD Interface and said network, means for functionally communicating over said network with said first remote computer system and means for establishing a communications pipe; said means for establishing a communications pipe comprising:

client communications insane for transmitting and receiving message packets over said network using a packet based communications protocol, and for transmitting and receiving APDUs through said PSD Interface, first client data processing means for receiving incoming message packets from said first remote computer system using said client communications means, separating encapsulated APDUs from said incoming message packets thus generating decapsulated APDUs and routing said decapsulated APDUs to said PSD through said PSD Interface independently of the origin and integrity of said incoming message packets, and second client data processing means for receiving incoming APDUs from said PSD interface, encapsulating said incoming APDUs into outgoing message packets and routing said outgoing message packets to said first remote computer system through said client communications means;

means for transferring incoming commands sent from said first remote computer system through said established communications pipe to said PSD; and means for transferring outgoing responses generated by said PSD to said first remote computer through said established communications pipe;

said at least one PSD further comprising;

at least one embedded PSD authenticating means, means to respond to at least one incoming command, means to generate an outgoing authentication response, means to transfer said authenticating means through said client to said first remote computer system, and cryptography means for decrypting said incoming commands and encrypting said outgoing responses, wherein said PSD is functionally connected and is functionally communicating with said client and said first remote computer system;

said at least one first remote computer system further comprising;

means for generating outgoing commands in a proper protocol for communicating with said PSD through said established communications pipe, a first authenticating means for authenticating said PSD responses, cryptography means for decrypting said incoming responses and encrypting said outgoing commands, storage means for storing said authenticating means transferred from said PSD, and a second authenticating means using said PSD authenticating means to provide authentication response to said subsequent remote computer system, wherein said first remote computer system is functionally connected to said network and is functionally communicating with said client and said PSD using said established communications pipe; and said at least one subsequent remote computer system further comprising:

means to generate authentication challenges, a third authenticating means for authenticating responses received over said network from said first remote computer system, wherein said subsequent remote computer system is functionally connected to said network and is in functional communications with said first remote computer system.

3. The system according to claim 1 or 2 wherein said communications employs an open protocol.

4. The system according to claim 1 or 2 wherein said communications employs a secure protocol.

5. The system according to claim 1 or 2 wherein said cryptography employs asynchronous methods.

6. The system according to claim 1 or 2 wherein said cryptography employs synchronous methods.

7. A method for providing authentication over a network using a pre-established communications pipe comprising;

establishing a communications pipe between a PSD and a first remote computer system over at least one network and using a client as a communications host for said PSD, wherein said client and said first remote computer system are in functional communication using a packet based communications protocol over said network, and wherein transmitting a first message from said first remote computer system to said PSD through said communications pipe comprises:

generating said first message on said first remote computer system, wherein said first message is in a non-native protocol for communicating with said PSD and said first message is generated by an API Level Program, converting on said remote computer system said first massage from said non-native protocol into a first APDU format message using a first server data processing means;

encapsulating on said first remote computer system said first APDU format message into said packet based communications protocol producing a first encapsulated message, using a second server data processing means, transmitting said first encapsulated message over said network using said packet based communications protocol, receiving by said client said first encapsulated massage sent over said network, processing said first encapsulated message using a first data processing means to separate said first APDU format message from said first encapsulated message, routing on said client said first APDU format message through a hardware device port assigned to a PSD Interface independently of the origin and integrity of said first encapsulated message, wherein said PSD Interface is in processing communication with said PSD;

and wherein transmitting a second message from said PSD to said first remote computer system through said communications pipe comprises:

generating said second message in APDU format by said PSD using a second internal PSD data processing means and transmitting said second APDU format message through said PSD Interface, receiving by said client said second APDU format message through said PSD Interface and encapsulating said second APDU format message into said packet based communications protocol producing a second encapsulated message, using a second data processing means, transmitting said second encapsulated message over said network using said packet based communications protocol, receiving said second encapsulated message sent over said network by said remote computer system, processing said second encapsulated message using a third server data processing means to separate said second APDU message from said second encapsulated message thus generating a second decapsulated APDU message, converting by said remote computer system said second decapsulated APDU message into a second message in a non-native protocol using a forth server data processing means, and forwarding said second message to at least one API Level Program;

generating an authentication challenge on said first remote computer system in a proper format for processing by said PSD, encrypting said properly formatted challenge using a pre-established cryptography method, transmitting said encrypted challenge through said established communications pipe to said PSD, decrypting said encrypted challenge by said PSD using said pre-established cryptography method, generating an authentication response by said PSD using said decrypted challenge and at least one internal PSD algorithm, encrypting said authentication response using said pre-established cryptography method, transmitting said encrypted authentication response through said established communications pipe to said first remote computer system, and decrypting said encrypted authentication response by said first remote computer system using said pre-established cryptography method and authenticating said response by said first remote computer system using at least one internal authentication algorithm.

8. The method according to claim 7, further comprising;

redirecting subsequent authentication challenges received over said network from a subsequent remote computer system to said first remote computer system, processing said subsequent authentication challenges in said proper format for processing by said PSD through said established communications pipe, encrypting said properly formatted challenge using said pre-established cryptography method, transmitting said encrypted challenge through said established communications pipe to said PSD, decrypting said encrypted challenge by said PSD using said pre-established cryptography method, generating an authentication response by said PSD using said decrypted challenge and at least one internal PSD algorithm, encrypting said authentication response using said pre-established cryptography method, transmitting said encrypted authentication response through said established communications pipe to said first remote computer system, decrypting said encrypted authentication response by said first remote computer system using said pre-established cryptography method, and routing said authentication response over said network to said subsequent remote computer system, authenticating said response by said subsequent remote computer system using at least one internal authentication algorithms.

9. The method according to claim 7 wherein said communications is an open protocol.

10. The method according to claim 7 wherein said communications is a secure protocol.

11. The method according to claim 7 wherein said cryptography employs asynchronous methods.

12. The method according to claim 7 wherein said cryptography employs synchronous methods.

13. A method for providing authentication aver a network using a pre-established communications pipe comprising:

establishing a communications pipe between a PSD and a first remote computer system over at least one network and using a client as a communications host for said PSD, wherein said client and said first remote computer system are in functional communication using a packet based communications protocol over said network, wherein said PSD comprises an internal PSD algorithm, and wherein transmitting a first message from said first remote computer system to said PSD through said communications pipe comprises:

generating said first message on said first remote computer system, wherein said first message is in a non-native protocol for communicating with said PSD and said first message is generated by an API Level Program, converting on said remote computer system said first message from said non-native protocol into a first APDU format message using a first server data processing means, encapsulating on said first remote computer system said first APDU format message into said packet based communications protocol producing a first encapsulated message, using a second server data processing means, transmitting said first encapsulated message over said network using said packet based communications protocol, receiving by said client said first encapsulated message sent over said network, processing said first encapsulated message using a first data processing moans to separate said first APDU format message from said first encapsulated message, routing on said client said first APDU format message through a hardware device port assigned to a PSD Interface independently of the origin and integrity of said first encapsulated message, wherein said PSD Interface is in processing communication with said PSD;

and wherein transmitting a second message from said PSD to said first remote computer system through said communications pipe comprises:

generating said second message in APDU format by said PSD using a second internal PSD data processing means and transmitting said second APDU format message through said PSD Interface, receiving by said client said second APDU format massage through said PSD Interface and encapsulating said second APDU format message into said packet based communications protocol producing a second encapsulated message, using a second data processing means, transmitting said second encapsulated message over said network using said packet based communications protocol, receiving said second encapsulated message sent over said network by said remote computer system, processing said second encapsulated message using a third server data processing means to separate said second APDU message from said second encapsulated message thus generating a second decapsulated APDU message, converting by said remote computer system said second decapsulated APDU message into a second message in a non-native protocol using a forth server data processing means, and forwarding said second message to at least one API Level Program;

generating a command for requesting a transfer of said internal PSD algorithm, on a first remote computer system in proper format for processing by said PSD, encrypting said properly formatted transfer command using a pre-established cryptography method, transmitting said encrypted transfer command through said established communications pipe to said PSD, decrypting said encrypted transfer command by said PSD using said pre-established cryptography method, copying said internal PSD algorithm into an internal memory location, encrypting said internal PSD algorithm using said pre-established cryptography method, transmitting said encrypted internal PSD algorithm through said established communications pipe to said first remote computer system, decrypting said encrypted internal PSD algorithm by said first remote computer system using said pro-established cryptography method and storing said internal PSD algorithm in a secure location, receiving at least one remote authentication challenge over said network from at least one subsequent remote computer system by said first remote computer system, generating an authentication response by said first remote computer system using said stored internal PSD algorithm, transmitting said generated authentication response over said network to said subsequent remote computer system, and authenticating said response by said subsequent remote computer system using at least one internal authentication algorithm.

14. The method according to claim 13 wherein said communications is an open protocol.

15. The method according to claim 13 wherein said communications is a secure protocol.

16. The method according to claim 13 wherein said cryptography employs asynchronous methods.

17. The method according to claim 13 wherein said cryptography employs synchronous methods.

* * * * *